United States Patent [19]
Tisma

[11] Patent Number: 5,452,568
[45] Date of Patent: * Sep. 26, 1995

[54] AUTOMATIC PACKAGING EQUIPMENT

[75] Inventor: Stevan Tisma, Elk Grove Village, Ill.

[73] Assignee: Tisma Machinery Corporation, Ill.

[ * ] Notice: The portion of the term of this patent subsequent to Feb. 16, 2010 has been disclaimed.

[21] Appl. No.: 131

[22] Filed: Jan. 4, 1993

Related U.S. Application Data

[63] Continuation-in-part of Ser. No. 984,087, Dec. 1, 1992, abandoned, which is a continuation-in-part of Ser. No. 858,888, Mar. 27, 1992, Pat. No.5,185,984, and a continuation-in-part of Ser. No. 762,497, Sep. 19, 1991, Pat. No.5,170,610, which is a continuation-in-part of Ser. No. 508,269, Apr. 11, 1990, Pat. No.5,072,573, which is a continuation-in-part of Ser. No. 464,162, Jan. 12, 1990, abandoned.

[51] Int. Cl.$^6$ .............................. B65B 39/02; B65B 39/14
[52] U.S. Cl. ................................ 53/579; 53/252; 53/257
[58] Field of Search .............................. 53/252, 257, 261, 53/566, 251, 260, 564, 579, 578, 258; 198/803.9, 803.11; 493/474

[56] References Cited

U.S. PATENT DOCUMENTS

| | | | |
|---|---|---|---|
| 3,879,920 | 4/1975 | Langen | 53/252 X |
| 4,211,054 | 7/1980 | Sramek | 53/252 X |
| 4,730,443 | 3/1988 | Matsuda et al. | 53/252 X |
| 5,144,790 | 9/1992 | Tisma | 53/255 X |
| 5,185,984 | 2/1993 | Tisma | 53/252 |

*Primary Examiner*—James F. Coan
*Attorney, Agent, or Firm*—Laff, Whitesel, Conte & Saret, Ltd.

[57] ABSTRACT

An automatic packaging machine comprises a spaced parallel pair of conveyor chains for transporting a plurality of pallets around an endless path. A pair of guide rails are connected between the conveyor chains for slidingly carrying each pallet. A plurality of control bars are slidably mounted on the guide rails. Two or more cam slots are provided at selected locations along the path followed by the conveyor chains in order to independently control the position of each of the control bars as a function of their instantaneous locations in the packaging machine. A stabilization support system built into the control bars provides enough play to dissipate centrifugal force and thereby enable the machine to operate at a higher speed. An X–Y mounting system may be provided in order to enable the pallets to undertake two dimensional motion. The control bars enable specific points in the surface area of the pallet to undertake specific motions which are independent of the motion of the pallet.

25 Claims, 9 Drawing Sheets

AUTOMATIC PACKAGING EQUIPMENT

This is a Continuation-in-Part of Ser. No. 07/984,087, filed Dec. 1, 1992, and now abandoned; which in turn is a continuation-in-part of Ser. No. 858,888, filed Mar. 27, 1992, now U.S. Pat. No. 5,185,984 and of Ser. No. 07/762,497 filed Sep. 19, 1991, now U.S. Pat. No. 5,170,610 issued Dec. 15, 1992; which in turn is a continuation-in-part of Ser. No. 07/508,269, filed Apr. 11, 1990, now U.S. Pat. No. 5,072,573 issued Dec. 17, 1991; which was a continuation-in-part of Ser. No. 07/464,162 filed Jan. 12, 1990, now abandoned.

Reference is made to the following patents by way of background information: U.S. Pat. Nos. 3,317,029; 3,608,701; 4,491,267; 4,578,929; 4,713,928; 4,716,714; 4,738,081; 4,745,732; 4,829,751; 4,856,566; 4,982,556; 5,010,929; 5,058,634; 5,072,573; and 5,144,790.

These aforementioned patents have taught several principles which are combined and enlarged upon by the present invention. A first of the principles (U.S. Pat. No. 5,072,573) involves a product carrying mandrel which may be made wider to receive product so that it may be dropped less accurately or it may be a randomly sized or shaped product. Then the mandrel may be made narrow to shape the product and to fit it within a box. The control over the mandrel width is responsive to a cam track along at least part of the path followed by the mandrel. Another principle shown in the foregoing patents involves thrusting the mandrel forward in order to position it near a box or other receptacle: U.S. Pat. Nos. 4,829,751; 4,982,556; and 5,072,573. This thrusting is also under the control of a cam track along the path followed by the mandrel. Thereafter, a pusher, also controlled by a cam track, pushes the product from the forwardly positioned mandrel into the box.

Still another principle shown in these patents (U.S. Pat. No. 5,144,790) involves an anti-inertia or stabilization bar which provides a mount that absorbs centrifugal forces as the mandrel circles a sprocket wheel powering a chain link conveyor. When the packaging machine is run at the high speeds which are now possible, the mandrel had sometimes slammed into the link chain as it rounded the sprocket. The stabilization bar has smoothed the circular excursion of the mandrel and dissipated the centrifugal forces so that the slamming no longer occurs.

Accordingly, an object of the invention is to provide new and improved automatic packaging machines. Here, an object is to provide a plurality of stabilization bars which may be individually and more accurately controlled while the mandrel is being moved from one position to another position, thereby increasing the number of functions that may be performed.

Still another object of the invention is to accomplish these objects while enabling the packaging machine to be operated at higher speeds.

In keeping with an aspect of the invention, these and other objects are accomplished by providing a plurality of individually movable stabilization bars that may perform many automatic packaging functions which have not been possible heretofore. According to the invention, a combination of cam tracks, individual stabilization bars, and cam followers are used to program the automatic packaging machine to carry out sophisticated functions not heretofore possible in such a straightforward manner. A suitable number of cam tracks are located between the conveyor chains and under the path followed by the mandrel. These cam tracks control the individual positions of the stabilizing bars. These bars perform different functions at different places in the excursion of the mandrels around the path established by the conveyor. Also, the bars dissipate the centrifugal force acting on the mandrels while they circle the sprocket wheel.

More particularly, an automatic packaging machine includes a plurality of pallets, each having means for defining a surface area. A link chain conveyor transports the pallets around an endless path. An orthogonal support means is located between each of the pallets and the conveyor chain for enabling the pallets to selectively undertake two independent motions in X and Y directions as a function of the pallets instantaneous location on the path followed by the conveyor. Stabilizer bars on each of the pallets enable independent movement at a plurality of locations on the surface area. Cam tracks are located at selected locations along the path for controlling both the X-Y motion of the pallet and the movements in the surface area of the pallet. As a result the automatic packaging means may be programmed by cam tracks to perform packaging functions that could not be performed heretofore in such a simple and straightforward manner.

A preferred embodiment of the invention is shown in the attached drawings, in which:

FIG. 9 is a bottom plan view of the pallet of FIG. 8;

Figure 1:
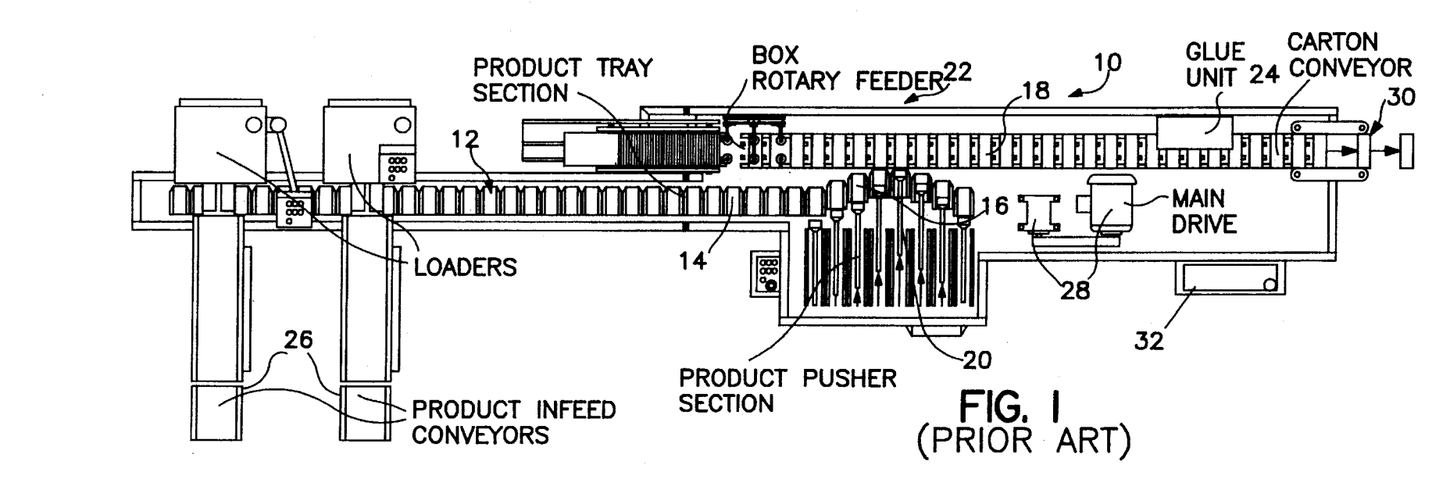
FIG. 1 is a plan view of an automatic packaging machine which may incorporate the present invention.
Figure 2:
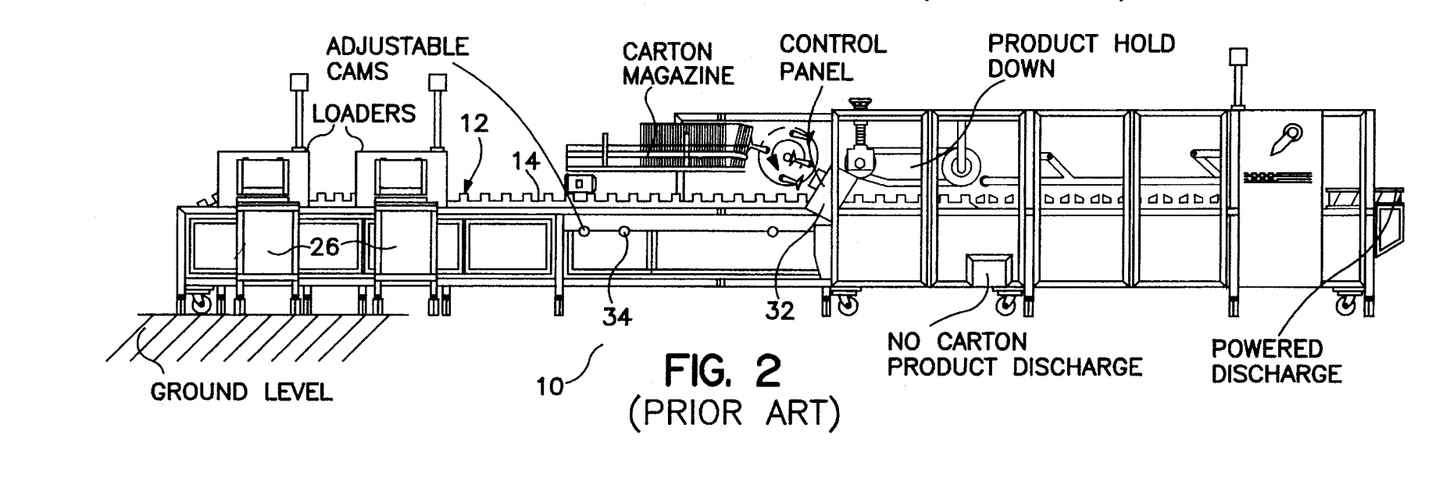
FIG. 2 is a frontal elevational view of the machine shown in FIG. 1.

Briefly, FIGS. 1 and 2 are plan and front elevational views of a high speed packaging machine 10 of a type that may utilize the teachings of the present invention. The machine 10 includes an elongated conveyor 12 carrying adjustable width product mandrels 14 past a plurality of work stations, one having a thruster section 16 where the mandrels 14 are thrust forwardly into a juxtaposed relationship with respect to confronting boxes, such as box 18. The conveyors carry the mandrels 14 through a loader area at 26 where they pick up product and carry it forward to an area 22 where the product is loaded into boxes. A pusher rod 20 pushes the product from the forwardly thrust mandrel 16 into a box 18. The machine may include any other work stations having suitable modules such as a carton or box feeder, glue unit 24, product loaders 26, power drive units 28, discharge units 30, and miscellaneous system controls 32 and adjustment means 34.

Figure 3:
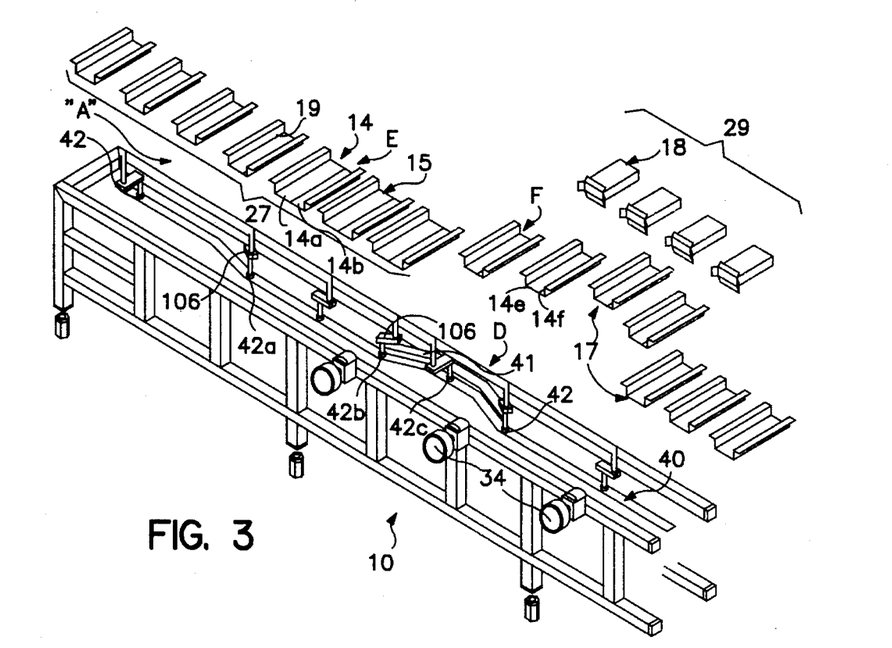
FIG. 3 is a partially exploded schematic perspective view of one of the cam tracks, referred to above, showing the movement of a mandrel width control cam follower at various positions along the track as the mandrel is moved from a position where it is at its widest to a position where it is at its narrowest and where it is thrust into proximity of a box at a loading station.

In FIG. 3, a plurality of mandrels 14 are shown in various dispositions as to their width. The mandrels 14 are generally two overlapping, L-shaped, sheet metal members 14a and 14b which divergently or convergently slide over one another to provide a wide product receiving mandrel, as indicated at 15, or a narrow product loading mandrel, as shown at 17. A product (not shown) can be properly shaped and located by being squeezed toward the center of the mandrel by an inward movement of the upright lipped sides 19, until the opposite sides 19 are spaced apart by a distance which is complimentary to the lateral limits of the box 18.

When properly positioned, the front end of this mandrel may fit into and be encompassed by this open end of the box. The mandrels 14 are carried on a pair of spaced parallel link chain conveyors (not shown in FIG. 3). A first cam slot means 40 is positioned between the conveyors and adapted to accept and guide the cam followers 42 which control the mandrel width. A second cam slot 41 engages each mandrel as it passes a loading station or thrust area and causes the mandrel to move outwardly toward the boxes 18, to a loading position.

A stabilizing bar (FIG. 4) 70 for a variable width mandrel has a generally U-shaped configuration. The U has a base 72 including a through bore 74 forming bearing means riding on a leading slide rod 50a. Thus, base 72 may move back and forth (directions X, X) between the two link chain conveyors under the control of cam follower wheels 43, 43 riding in a cam slot between conveyor chains. A pair of arms 76, 76 extend outwardly from opposite ends of base 72 and include enclosed slot means 78, 78 for a slidable acceptance of the other spaced parallel slide rod 50b.

Figure 4:
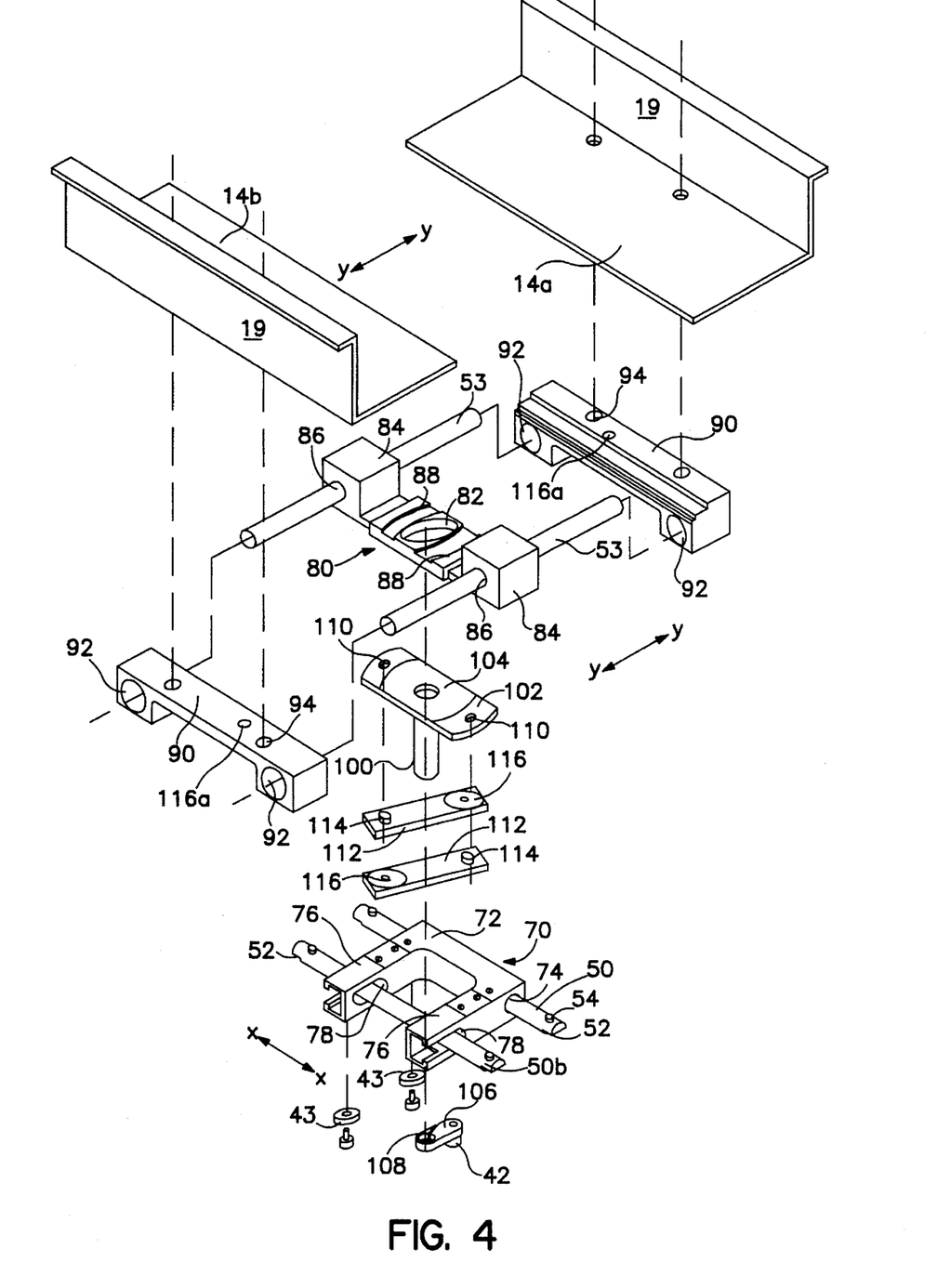
FIG. 4 is an exploded perspective view of the parts making up the cam follower mechanism and width adjustable mandrel, including the orthogonally disposed support rods, the stabilization bar, and the cam follower translation mechanism which gives motions in X-Y directions.

A rigid transverse platform means 80 extending between and mounted on the arms 76, 76 has a centrally disposed aperture 82. On opposite ends of platform 80 are a pair of blocks 84 which are mounted on arms 76, 76, by any suitable means, such as bolts. Through bores 86, 86 in blocks 84 accept and retain the second pair of slide rods 53, 53 which are orthogonally disposed relative to the first pair of slide rods 50, 50. The rods 53, 53 enable a back and forth sliding motion in directions Y, Y. On opposite sides of platform means 80, a pair of control bar means 90 have spaced bearing blocks 92 which are slidably carried by slide rods 53, 53. The oppositely disposed two halves, 14a and 14b, forming the mandrel 14 are each mounted on individually associated ones by any suitable fastener means 94 of the slidable control bar means 90.

A shaft 100 is carried by a lever plate 102 which is concavely embossed at 104. The shaft 100 extends downwardly through aperture 82. The cam follower 42 is carried by a crank arm 106 mounted at 180 on shaft 100. The plate 102 includes oppositely disposed bearing apertures 110 that are each connected to a bearing 114 on apertured crank 112.

The aperture 116 at the opposite end of each crank arm 112 is suitably fastened to one of the control bar means 90 intermediate its length, as at 116a.

Thus, as it travels in the cam slot 40 (FIG. 3), the movement of the cam follower 42 causes a rotation of the shaft 100 and its attached plate 102, resulting in a convergent or divergent movement of each of the control bar means 90 as it slides along the slide rods 53, 53. Movement of control bar means 90 causes the mandrel halves 14a and 14b to move inwardly or outwardly relative to the instantaneous position which they are passing in the cam track 40. Similarly, the platform means 80 is subject to the forces exerted by the cam follower 42 and, when directed, move along the rods 50, 50. Hence, the orthogonal relationship of the slidable movement along the X-axis and Y axis maintains the desired width of the mandrel 14 during its progression along the conveyor.

In operation, the conveyor chains 60, 60 endlessly circle (FIG. 5) around longitudinally displaced sprocket wheels, one of which is shown at 62. As they circle the sprockets, the length, weight, and motion of the mandrel might cause it to rock back and forth, striking the chain unless restrained.

Figure 5:
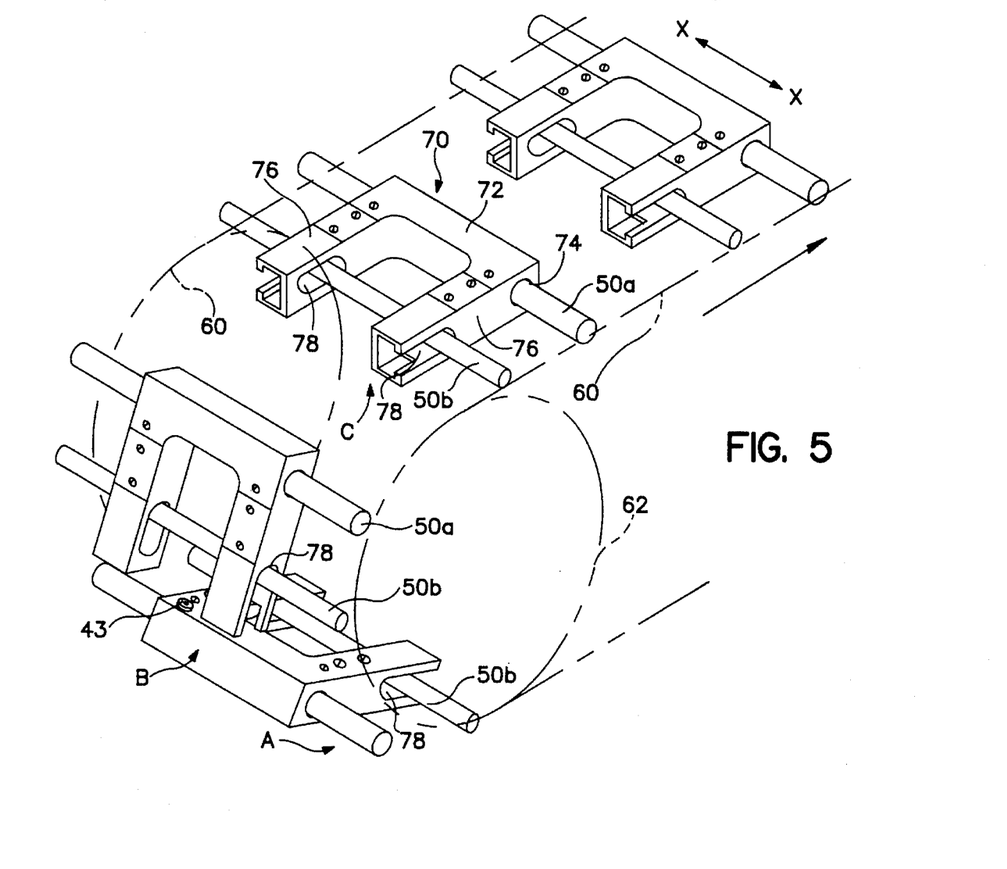
FIG. 5 is an enlarged schematic perspective view showing a plurality of the stabilization bars for supporting parts as the conveyor chain moves them.
Figure 6:
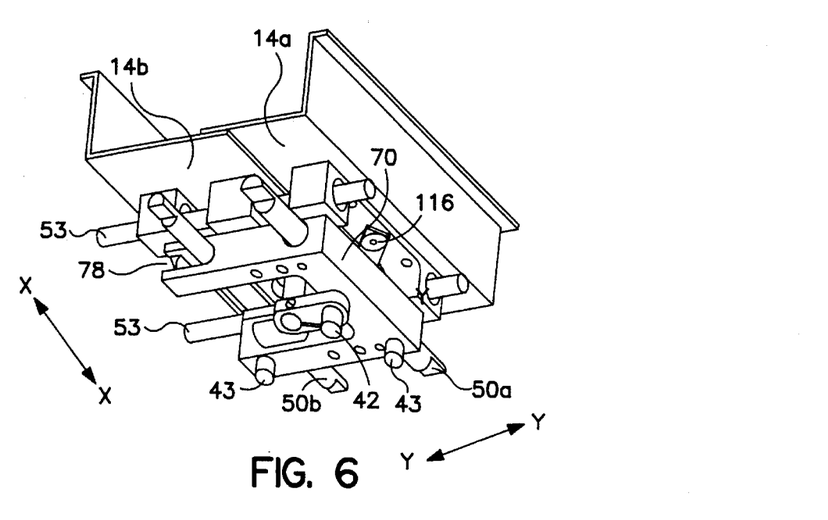
FIG. 6 is an underside perspective view of an orthogonal motion support means.
Figure 7:
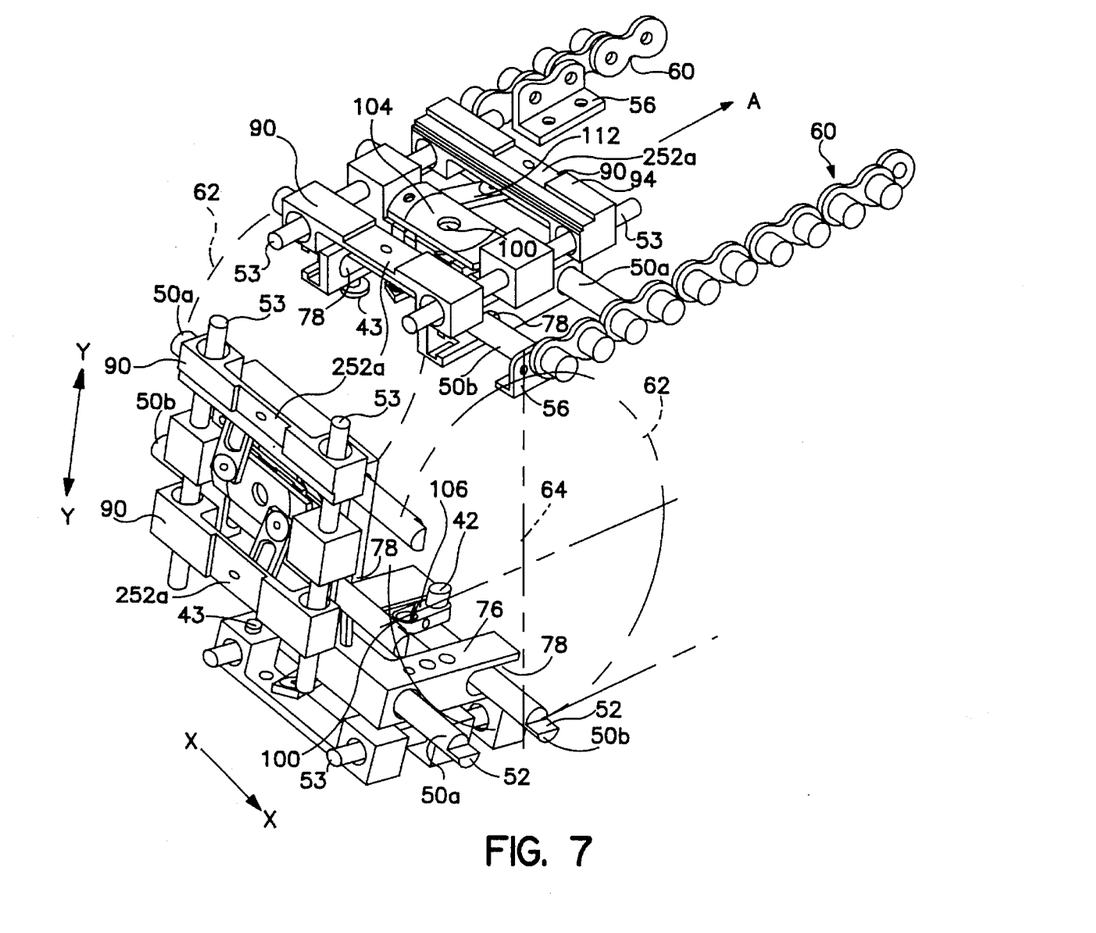
FIG. 7 is a partly exploded, schematic perspective view showing an orthogonal support mechanism for pallets, the support mechanism being mounted on a pair of parallel endless link chains forming a conveyor.

FIGS. 5–7 show a mandrel or pallet support having a substantially rigid orthogonally disposed pairs of parallel guide or slide rods. Rods 50, 50 extend between and are attached to the spaced parallel chain link conveyors 60, 60 that are trained over and ride on sprockets 62, here shown as vertically arranged and disposed on a horizontal axis 64. For purposes of discussion, the rods 50, 50 may be described as the X-axis of the orthogonal array. They have flattened end portions 52 (FIG. 7) that are fastened to any suitable supporting clip 56 carried by the chains 60, 60.

A problem relates to a centrifugal force which causes a mandrel to try to swing outwardly and then back and forth as the mandrel goes around the circle defined by the sprocket wheels at the opposite ends of the long oval transport track.

When the mandrel returns from the sprocket wheel to the straight section of the conveyor chain, the swinging mandrel may slam into the conveyor with a hard blow. The problem becomes more severe if the conveyor is driven at high speeds or if the mandrel becomes too large or too heavy. With this kind of action, the mandrel may soon hammer itself out of shape and greatly damage the conveyor chain, especially when the mandrel is carrying heavy loads such as five or ten pounds, for example.

The invention provides means for increasing the speed of the packaging machine by a factor which may be in the order of 100%, for example, by coping with the centrifugal forces acting upon the mandrel. The invention uses a stabilizing bar 70 (FIG. 5) with a slot 78 which is long enough to provide an excursion relative to a guide bar 50b carrying the mandrel or a pallet in order to dissipate centrifugal forces as it traverses the circular path around a sprocket. The slot 78 is on a trailing edge of the mandrel or pallet support to enable the conveyor chain to pull it at a pivot point.

At the start of the excursion around the sprocket wheel, rod 50b is in the back or trailing end of the slot 78. At the center of the sprocket, the rod 50b advances to the front or leading end of slot 78. By the time that the mandrel or pallet leaves the sprocket, the rod 50b returns to the trailing end of the slot. Thus, there is no whipping back and forth responsive to centrifugal forces.

The stabilization bar 70 is free to slide back and forth (directions X—X) along the bars 50, 50, under the urging of cam follower wheels 43, riding in a cam slot 41. Meanwhile, as the mandrels or pallets are carried by the conveyor, the crank arm cam followers 42 follow the cam slot 40. At the position of follower 42a, the crank arm 106 is turned to rotate shaft 100 (FIG. 4), plate 102 and lever arms 112, 112, which push apart (directions Y—Y) the control bars 90, 90 that slide divergently on rods 53, 53.

The conveyors carry the control bars 90, 90 to a location shown by the cam follower 42b where the crank arm 106 is turned. Shaft 100 (FIG. 4) rotates under the driving force of the crank arm 106. This, in turn, rotates plate 102 and pulls arms 112, 112 to convergently draw in the control bars 90, 90. If some other behavior of the control bars 90, 90 is desirable, the contours of slot 41 may be changed.

The control bars 90, 90 may be programmed to operated in combination with other parts of the automatic packaging machines which are also programmed by a cam track. For example, one cam track 41 controls the space between members 99, 90 while another cam track 42 controls a pushing of a product into a box.

In keeping with the invention, a pallet (FIG. 8) comprises any suitable number (a "plurality") of independently movable bars ("control bars") 200–208, which are slidably mounted on the bars 50a, 50b which are connected at their opposite ends to the conveyor chains 60, 60 via connectors 56.

Figure 8:
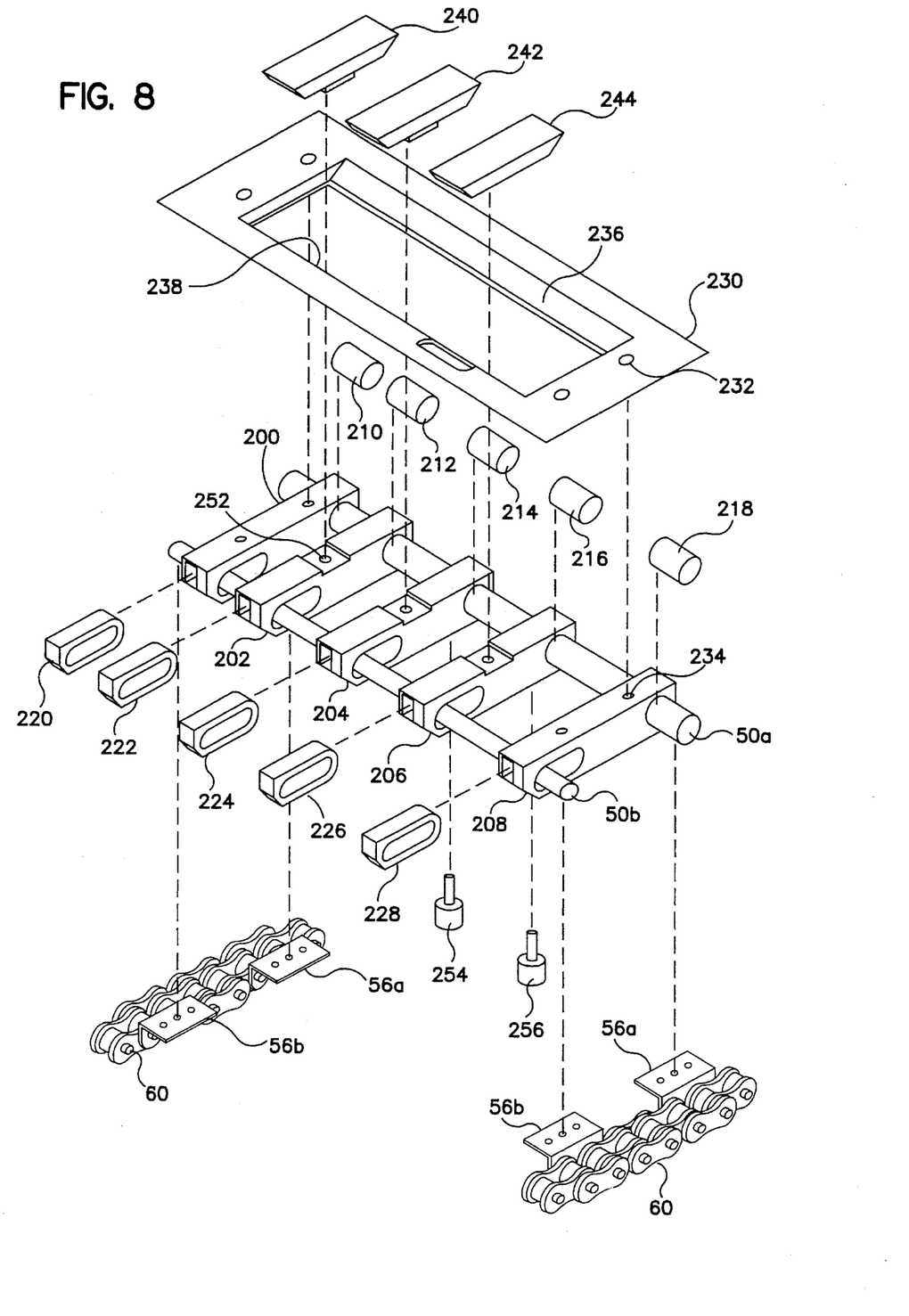
FIG. 8 is an exploded perspective view of a pallet showing a multi-stabilizing bar assembly for individually controlling a plurality of operations as the mandrel travels around a path established by the endless conveyors.

Each of the plurality of control bars has a wear resistant bronze or nylon bearing 210–218 individually associated with its leading ends for receiving the leading slide bar 50a and a similar sliding bearing 220–228 individually associated with its trailing ends to receive the trailing bar 50b. These bearings absorb any wear occurring as a result of the control bars 200–208 sliding on slide bars 50 as the control bars move together or apart and as the conveyor chains 60, 60 carry them around the sprocket wheel.

The outside two control bars 200, 208 have a rigid frame 230 attached to them by any suitable fasteners (such as bolts) passing through holes, such as holes 232, 234, in the frame and in bars 200, 208. This frame defines a surface area which may serve any useful purpose, such as carrying a mandrel or the like (not shown) attached thereto. The inside longitudinal frame edges 236, 238 (parallel to slide rods 50, 50) have tapered faces forming tracks.

Figure 8A:
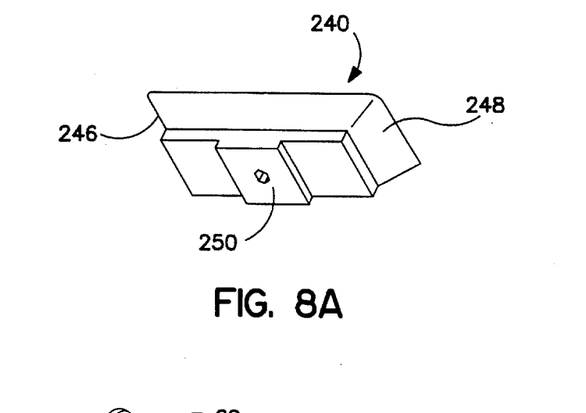

Each of the inner control bars 202, 204, 206 has a support member 240, 242, 244 bolted or otherwise fastened thereto. The details of these support members are apparent from the enlarged showing of member 240 in FIG. 8A. The opposite ends 246, 248 of support member 240 have a taper matching the tapered track forming faces 236, 238 of frame 230. The bottom of the support member 240 has a keying enlargement 250 which fits into a matching keying recess 252 in the control bar 240. Each of the support members 242, 244 has a similar keying association with its control bar 204, 206. The control bars 90, 90 (FIG. 7) may also have an area 252a for receiving a support member 240.

A wheel 254, 256 may be attached to the bottom of each of the control bars 202, 204, 206 in order to provide cam followers which fit into individually associated cam tracks similar to tracks 40, 41 of FIG. 3. Therefore, as the pallet (FIG. 8) moves around the path established by the conveyor chains, the control bars 202, 204, 206 move back and forth in a predetermined manner.

Figure 9:
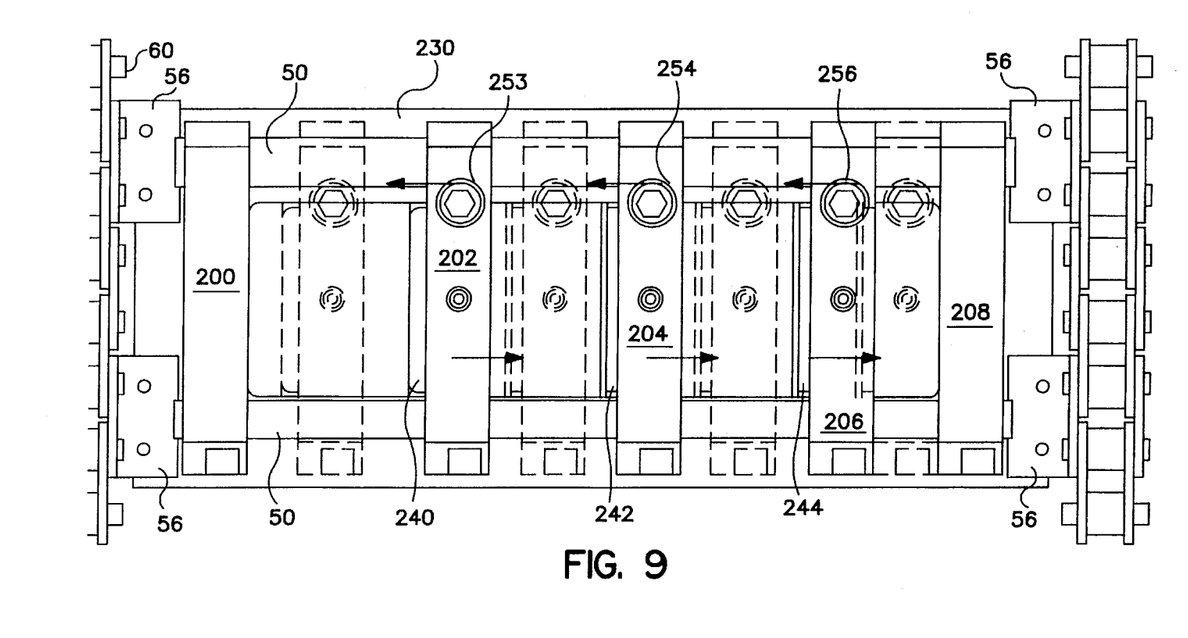
FIG. 9 is an enlarged perspective view of the bottom of a support member also seen in FIG. 8.
Figure 10:
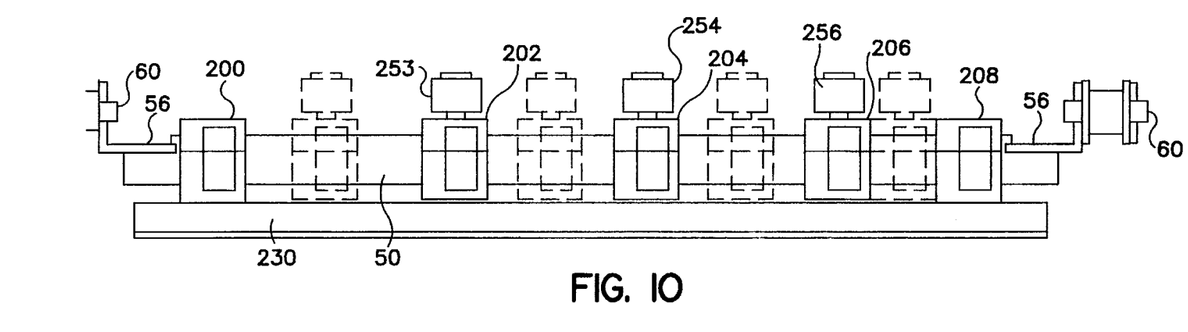
FIG. 10 is a side elevation of the pallet, with respect to FIG. 8.
Figure 11:
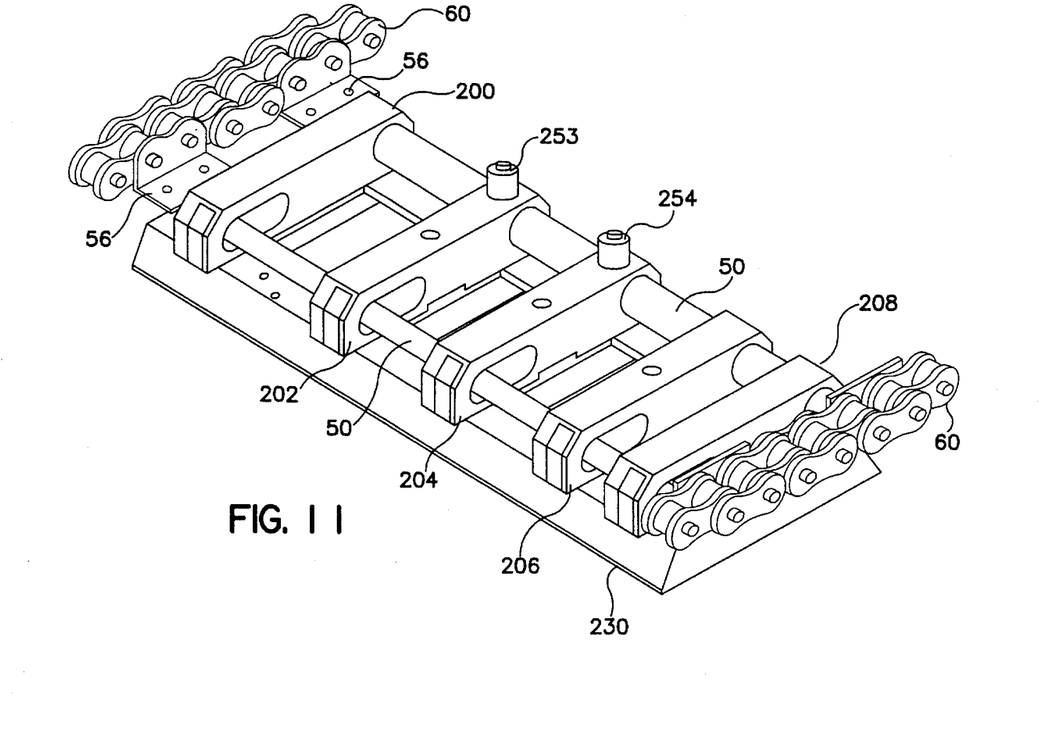
FIG. 11 is an inverted perspective view of the pallet of FIG. 8.

This back and forth movement is indicated in FIGS. 9, 10, which show complete assemblies of the pallet, which is also shown in exploded view of FIG. 8. In FIG. 9, arrows indicate that control bars 202, 204, 206 may enjoy a back and forth movement. Solid lines show the control bars and cam wheels 253, 254, 256 in one position while dashed lines show them in alternative positions selected by cam followers 253, 254, 256 tracking the underlying cam slots. Thus, while the conveyor chains carry the pallet of FIGS. 9, 10 around the transport path, each of the control bars 202, 204, 206 may undertake individual and unrelated movements to any of these or intermediate positions.

Also, any suitable number of control bars may be provided. Therefore, although three bars 202–206 are here shown, there could be one, two, four or some other suitable number of control bars. The control bars may be mixed so that some move and some do not move relative to the other control bars. For example, in FIG. 8, control bars 204, 206 have cam wheels 254 and 256 for controlling their movement while the control bar 202 is shown with no cam wheel and, therefore, bar 202 may travel along the path of the conveyor chain without experiencing any movement along the bar 50.

Figure 12:
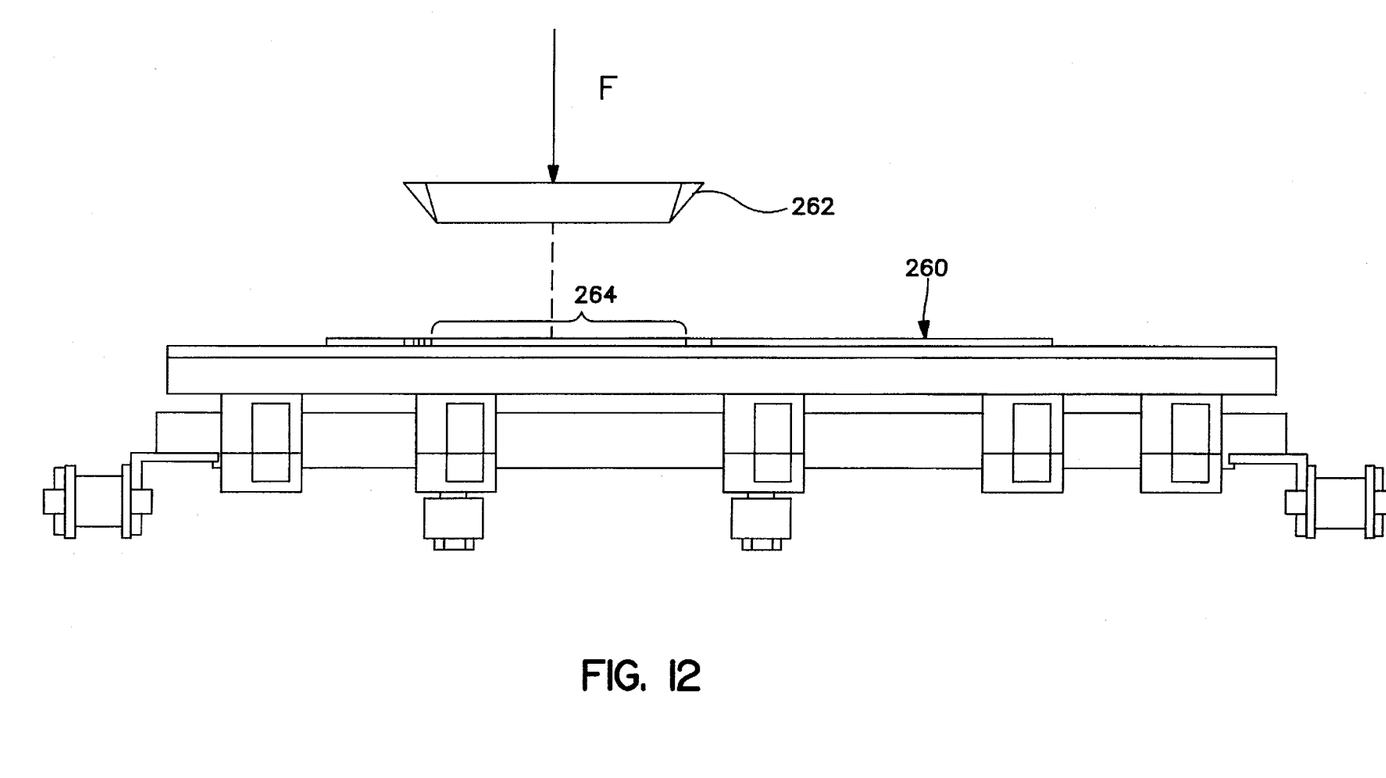
FIG. 12 is a view similar to, but inverted relative to FIG. 10 showing a cardboard blank on the pallet, with a pusher poised above and about to be lowered in order to hold the blank in place.
Figure 13:
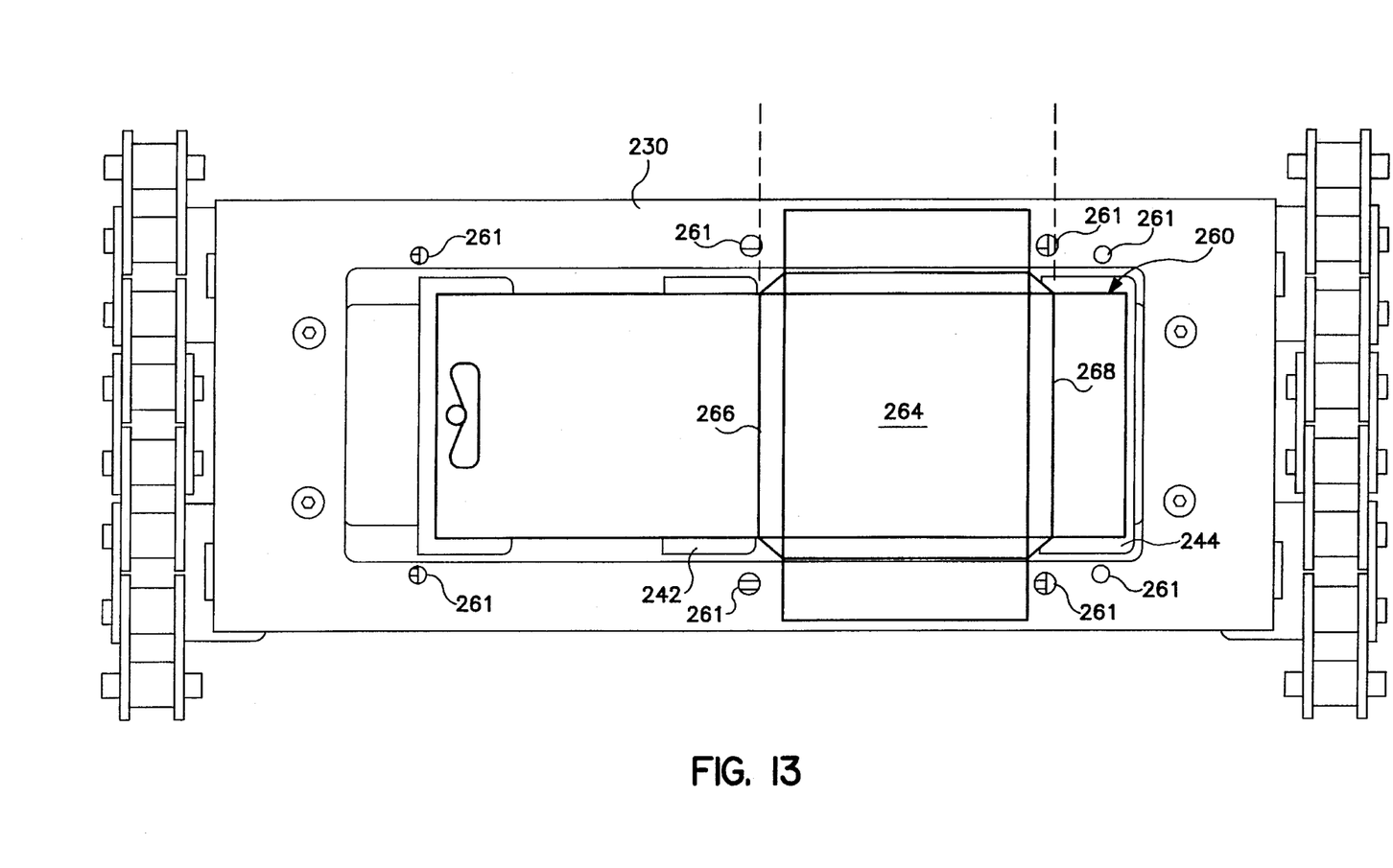
FIG. 13 is a plan view similar to, but inverted, relative to FIG. 9 and showing a cardboard blank in place on the pallet.

Folding paper, paperboard, or another fibrous blank into a box is an example of how the invention might find a special value. For example, some boxes might require a blank 260 (FIGS. 12, 13) to be folded in a prescribed sequence along a plurality of fold lines shown by heavily inked lines. Each control bar might have tabs or other means (not shown) for holding the blank in place during the folding. The blank 260 is held on frame 230 by any suitable means, such as bosses 261.

To do the folding, a pusher 262 (FIG. 12) is pressed against area 264 on blank 260. The first fold might begin with a creasing initiated by control bar 204 and support member 242 moving toward control bar 206 to fold blank 260 against pusher 262, forming a crease along fold line 266 in the process, while control bars 202, 204 remain a maximum distance apart. Then, perhaps control bar 206 and support 244 might move towards pusher 262, forming a crease along fold line 268. In like manner, the control bars 202–206 are moved independently and sequentially as programmed by underlying cam slots guiding wheels 254, 256 on the control bars.

In another example, the individual control bars may be moved to cause an effect which "conditions product", a term of art in the automatic packaging field. For example, a box of raisins can be filled by simply dumping them into a box, in which case they will stick together. When the ultimate buyer wants to consume the raisins, he has to dig a wad of raisins from the box. However, if the raisins are "conditioned" while they are being boxed, they do not stick together. The retail buyer may consume the raisins by shaking them out of the box in much the same manner that he shakes peanuts out of a box.

Still another example of "conditioning product" is found in the boxing of wafers or small pillows made of shredded wheat. If they are simply dumped into a box, their surface irregularities tend to become interlocked. When removed from the box they will likely be in clumps of, say two to four "wafers or pillows" with the fibrous surfaces interlocked. If they are "conditioned" while being boxed, they will remain as separate and be retrieved as individual wafers or blocks.

The prior art has often "conditioned product" by vibrating a box while it is being filled; however, that vibrating is wearing on the machinery. The invention may move the boxes in a serpentine pattern, for example, without wear caused by vibrations. Or, depending upon the configuration of the box, the invention may produce an effect upon the bottom box to a degree which conditions product without injury to the box.

By combining the principles described above in connection with FIGS. 4 to 8, it is seen that a plurality of pallets (such as FIG. 8) may be transported by an endless link chain conveyor 62, 62. Each of the pallets may have a frame 236, or the like, for defining a surface area which may carry a product or another packaging machine part as conveyor 62, 62 transports the pallets around an endless path.

If desired, a support means (FIG. 7) may be located between each of the pallets and the conveyor for enabling the pallets to selectively and independently undertake X and Y motions, as a function of the pallets instantaneous location on the endless path. The control bars 90, 202, 204, 206 are means on each of the pallets for enabling independent movements at any of a plurality of locations on the surface area. At selected locations along the path, cam slots (such as 41, 42, FIG. 3) program the packaging machine for controlling the X,Y motions and the control bar movements. Accordingly, almost any given point on a pallet may be programmed to move into almost any suitable position with respect to the conveyor 62, 62. For example, a frame such as 230 (FIG. 8) may be supported on bars 50, 50, 53, 53 (FIG. 4) to move in both of the X and Y directions (FIG. 4). Some of the movable parts may be controlled by cam follower wheels such as 43 (FIG. 4) and 254, 256 (FIG. 8). Other of the movable parts may be controlled by the crank arm 106 and cam follower 42 (FIG. 4) and a lever system, such as 112, 112, 104.

It should also be noted that the frame 230 might be mounted to set on the orthogonal support of FIG. 6 at an angle with respect to the direction of conveyor travel (Direction A, FIG. 7). The frame might be slidingly moved at this angle along the support of FIG. 6. Or the crank arm 106 (FIG. 4) may rotate bar 104 to rotate the frame 230. Regardless of how the frame 230 may move relative to Direction A, the control bars 202–206 (FIG. 8) will move in a direction perpendicular to the side of the frame.

Those who are skilled in the art will readily perceive how to modify the invention. Therefore, the appended claims are to be construed to cover all equivalent structures which fall within the true scope and spirit of the invention.

The claimed invention is:

1. In an automatic packaging machine, a combination comprising a pair of spaced parallel conveyor means establishing a path for carrying pallets through said packaging machine, said pallet having support means with freedom to move orthogonal directions whereby said pallet may be moved to a selected position in X and Y directions, said machine further comprising a pair of spaced parallel bars traveling with said conveyor means for providing movement in a first of said orthogonal directions, a plurality of separate and independent control bar means slidingly and orthogonally mounted on said spaced parallel bars for independently providing movement in a second of said orthogonal directions and between selectable positions along said spaced parallel bars, and means associated with and distributed along said established path for programming the X and Y positions of said control bar means during said movement of said pallet along said established path.

2. The combination of claim 1 wherein said conveyor means are link chains trained around spaced sprocket wheels, whereby said pallets experience centrifugal forces while circling said sprocket wheels, and each of said control bar means is pivotally associated with a leading one of said spaced parallel bars and slidingly associated with a trailing one of said spaced parallel bars whereby said centrifugal forces are dissipated by a sliding motion of a trailing one of said spaced parallel bars relative to said control bar means.

3. The combination of claim 1 and a cam follower on at least one of the control bar means for sliding said one control bar means along said spaced parallel bars, and said programming means comprises at least one cam track extending along at least a part of said established path, said cam follower riding in said cam track, the shape of said cam track adjusting the position of said cam follower and said one control bar means relative to the position of said pallet along said established path.

4. The combination of claim 3 wherein there are a plurality of said cam tracks extending along at least parts of said established path, means individually associated with at least some of said plurality of said control bar means for individually moving said control bar means along said spaced parallel bars in response to said pallet moving along said plurality of cam tracks, whereby said cam tracks separately adjust the movement of said individual ones of said control bar means along said spaced parallel bars responsive to said conveyor moving said pallet along said cam track means.

5. The combination of claim 4 wherein said plurality of cam tracks individually receive the cam followers of individually associated ones of said control bar means for individually controlling the positions of said associated control bar means along said spaced parallel bars, said pair of cam tracks being mutually contoured to synchronize the positions of said control bar means, whereby the instantaneous positions of said control bar means may be controlled independently of each other.

6. The combination of claim 5, said pallet further comprising a rigid frame moving with said conveyor, said control bar means being mounted within said frame, whereby an object attached to said frame moves with said conveyor, and said control bar means moves relative to the frame and under the control of said cam tracks.

7. The combination of claim 6 wherein at least some of said control bar means have support means which ride on track means formed by said frame.

8. The combination of claim 5 and support means interposed between said conveyor means and said pallet, said support means comprising an orthogonal array of slide bars for enabling movement of said pallets in orthogonal directions, a frame attached to said pallet for experiencing a movement in one direction, and individually movable control bar means associated with said pallet for enabling movement in another direction.

9. The combination of claim 8 wherein said one orthogonal direction is perpendicular to said path established by said conveyor.

10. The combination of claim 8 wherein at least one of the motions is a rotary motion.

11. The combination of claim 10 and means for providing another motion which is perpendicular to the instantaneous position responsive to said rotary motion.

12. The combination of claim 8 and at least one other part of said automatic packaging machine for performing a different function of said automatic packaging machine in at least one location along said established path, said different function being independent of functions performed by equipment mounted on the spaced parallel bars, and means for programming said different function responsive to a cam track in said machine, whereby said movements of said pallet and control bar means may be synchronized with said different function in response to an encountering of instantaneous positions along said established path.

13. A high speed automatic packaging machine including a pair of link chain conveyor means for transporting pallets in a given direction around a closed path, a pair of spaced parallel bars disposed on and between said pair of conveyor means to provide a freedom of pallet motion perpendicular to said given direction, a plurality of stabilizer bar means supported on and slidably moveable along said spaced parallel bars, at least a pair of cam tracks associated with said conveyor means in at least one part of a path over which said pallets are transported, and cam follower means operatively and individually associated with each of at least some of said stabilizer bar means and adapted to follow individually associated ones of said cam tracks, said pair of cam tracks being mutually contoured to program said stabilizer bar means to ride on said conveyor in controlled positions for at least a portion of an excursion of said conveyor, said mutual contour enabling individual ones of said stabilizer bar means to be controlled independently in order to separately perform selected functions in a programmed sequence.

14. A machine as claimed in claim 13 wherein each of said cam follower means is mounted on an individually associated one of said stabilizer bar means, the movement of individual ones of said cam followers causing their said individually associated stabilizer bar means to move independently relative to movement of other of said stabilizer bar means.

15. An automatic packaging machine for conditioning products comprising means for transporting a plurality of pallets around an endless path including a plurality of separate work stations, at least some of said work stations having unique requirements, a plurality of control means mounted on each of said pallets for individually moving relative to said endless path in response to said pallets being at particular ones of said unique work stations, and means individually associated with said control means and with locations along said endless path for independently operating each of said control means in order to condition a product as a function of its travel around said endless path.

16. An automatic packaging system for conditioning products, said system comprising conveyor means endlessly traveling over a closed path; at least one pallet attached to and traveling with said conveyor means; means for imparting a primary motion to said pallets during said travel over said endless path; said pallet having an associated guide way for enabling a secondary motion substantially perpendicular to said primary motion; a plurality of independently movable means mounted on said guide way associated with said pallet for providing an independent secondary motion to each of said independently movable means substantially perpendicular to said primary motion during said travel; and means associated with said conveyor means for commanding said independent secondary motion during at least part of said travel and as a function of the instantaneous position of said pallet relative to said path.

17. The system of claim 16 wherein said pallet comprises a frame having opposing sides forming said guide way and said support means have parts which move on said guide ways.

18. The system of claim 16 wherein said conveyor means comprises a space pair of link chains; said command means associated with said conveyor comprises at least one cam track positioned adjacent said link chains and having contours defining said secondary motion, and said independently movable means comprises at least one support member movably mounted to move on said guide way; said support means having an associated cam follower for following in said cam track.

19. The system of claim 18 wherein there are a plurality of said cam tracks and a plurality of said support means; each of said support means having an associated cam follower for following an individually associated one of said cam tracks.

20. The system of claim 19 wherein said plurality of cam tracks have mutual contours which program synchronized independent secondary motions of said support means for providing said product conditioning.

21. An automatic packaging system, comprising a conveyor following a closed path and having at least one pallet attached thereto, a plurality of separate support means associated with said pallet and mounted for undertaking independent movement responsive to path location information, and means at path locations for supplying the information required to cause said support means to undertake said independent movements.

22. An automatic packaging system, comprising a conveyor following a closed path and having at least one pallet attached thereto, a plurality of separate support means associated with said pallet and mounted for undertaking independent movement responsive to path location information, means at path locations for supplying the information required to cause said support means to undertake said independent movements, means on said pallet for forming fibrous blanks into specially shaped containers, said means comprising holding means for positioning one of said fibrous blanks on said pallet, pusher means having at least some contours corresponding to corresponding contours on said specially shaped containers, and means responsive to movements of said support means for forming said blank around said pusher means.

23. The system of claim 22 wherein said conveyor comprises a spaced parallel pair of endless link chains; said pallet comprises a pair of guide bars attached to and between said link chains so that one of said guide bars leads and the other of said guide bars trails as they are moved by said link chain; and each of said support means comprises an individually associated control bar pivotally attached to slide along said leading one of said guide bars and coupled to slide with lost motion along the other of said guide bars.

24. The system of claim 23 wherein said information supplying means further comprises a plurality cam tracks located between said link chains, and cam follower means individually associated with each of said control bars for following an individually associated one of said cam tracks.

25. An automatic packaging machine having a plurality of pallets, each of said pallets having means for defining a surface area; an endless conveyor for transporting said plurality of pallets around an endless path; support means for each of said pallets and located adjacent said conveyor for enabling separate points on the surface area of said pallets to selectively undertake independent two directional motions as a function of the pallets instantaneous location on said path, and cam means located at selected locations along said path for programming and controlling said motions and movements.

* * * * *